Dec. 8, 1970 A. D. VAN HORSSEN ET AL 3,546,658
CONNECTOR WITH SPLINED BACKSHELL
Filed April 22, 1968 2 Sheets-Sheet 1
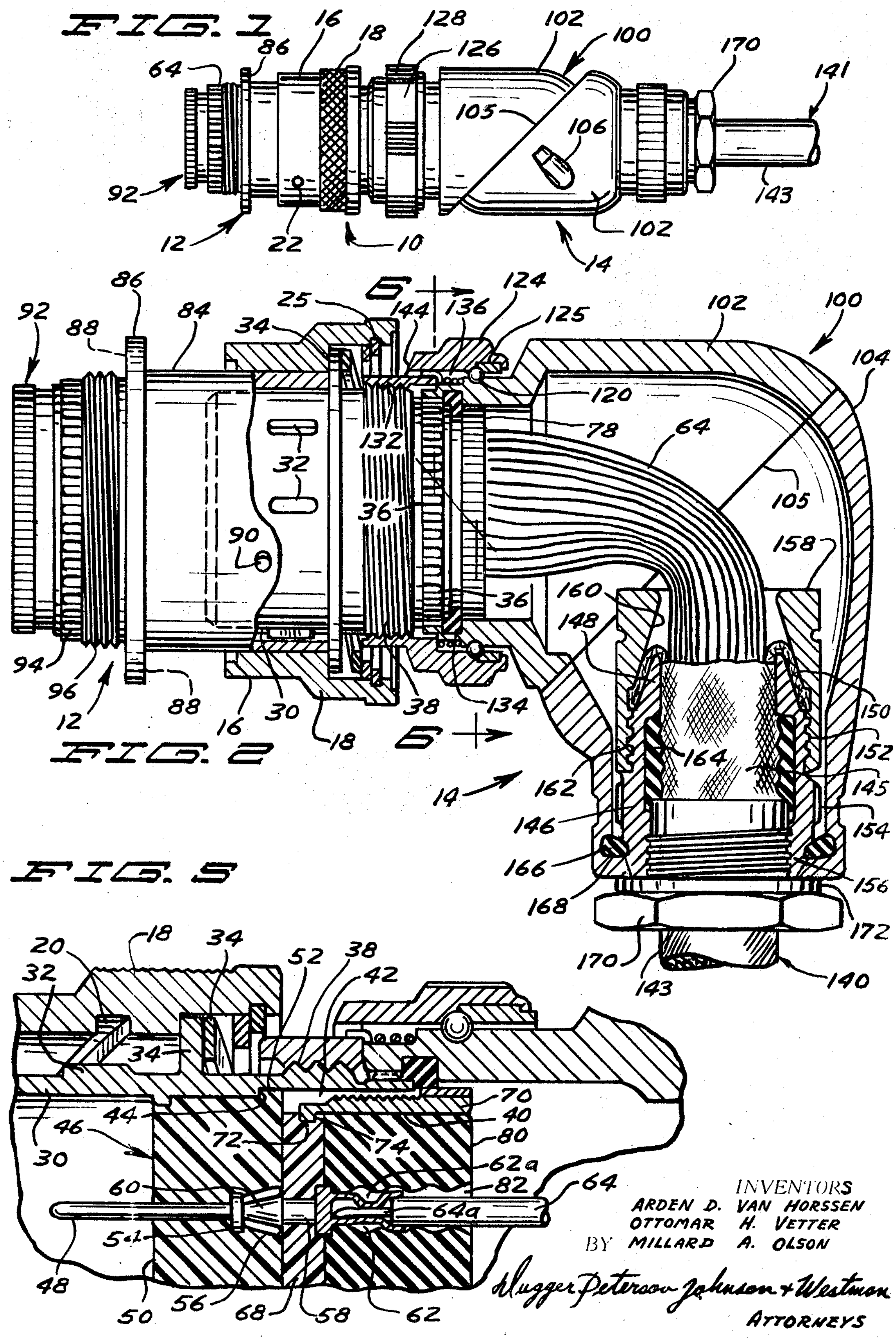

CONNECTOR WITH SPLINED BACKSHELL
Filed April 22, 1968 2 Sheets-Sheet 2
FIG. 3
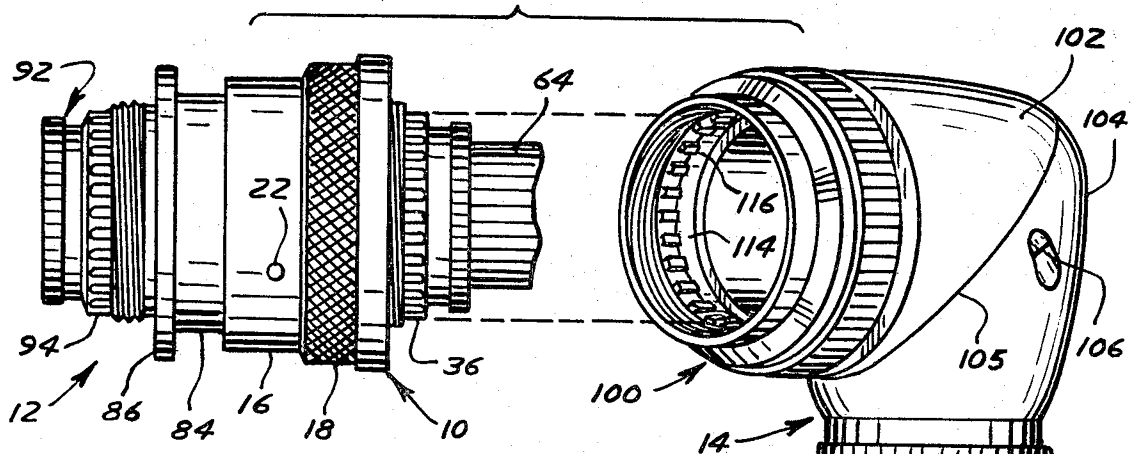
FIG. 4
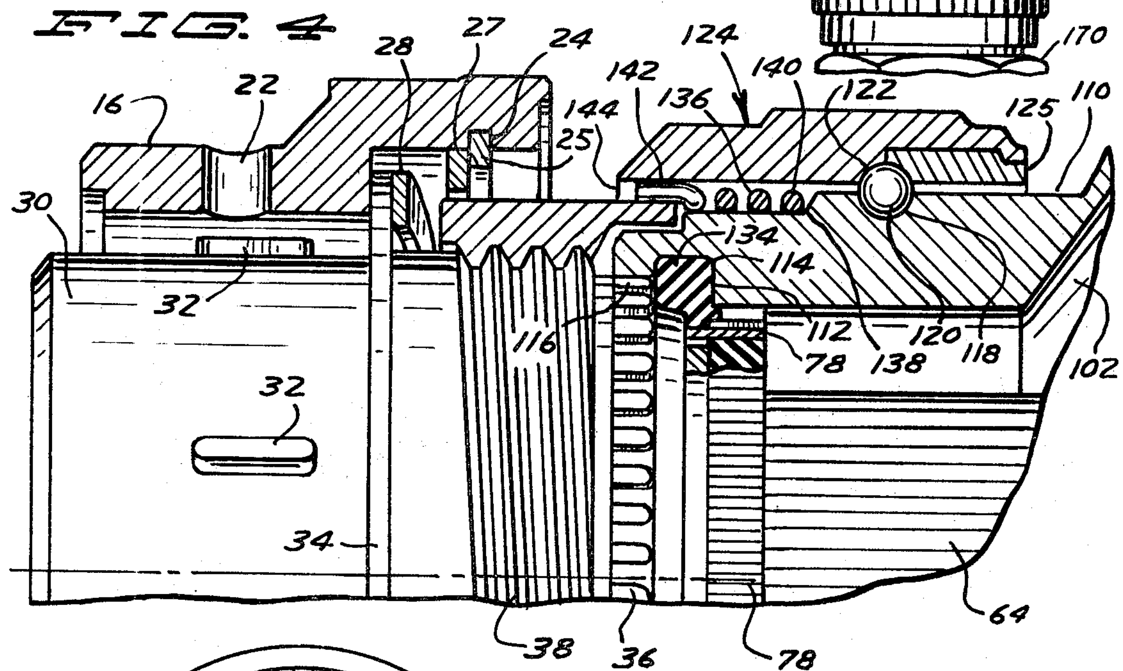
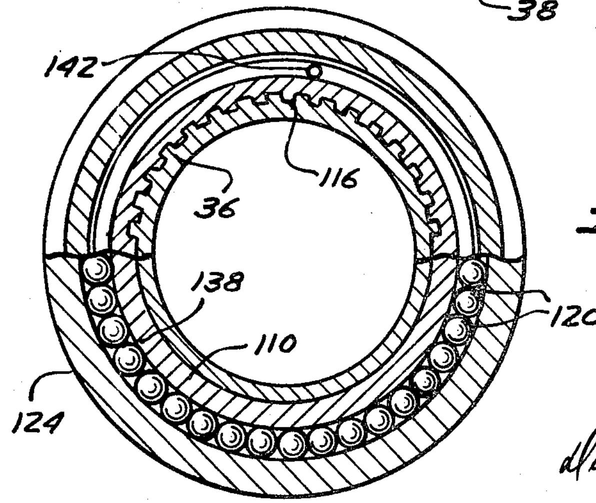
FIG. 5
INVENTORS
ARDEN D. VAN HORSSEN
OTTOMAR H. VETTER
MILLARD A. OLSON
BY
Dugger, Peterson, Johnson & Westman
ATTORNEYS United States Patent Office 3,546,658
Patented Dec. 8, 1970

3,546,658

CONNECTOR WITH SPLINED BACKSHELL

Arden D. Van Horssen, Ottomar H. Vetter, and Millard A. Olson, Minneapolis, Minn., assignors to United-Carr Incorporated, Boston, Mass., a corporation of Delaware Filed Apr. 22, 1968, Ser. No. 723,170
Int. Cl. H01r *13/54*
U.S. Cl. 339—90 5 Claims

ABSTRACT OF THE DISCLOSURE

A backshell has an internally splined section that interfits with an externally splined section on the electrical connector to which it is to be attached. A coupling nut is rotatably mounted on the backshell by means of ball bearings and has threads engageable with threads on the connector so that the two splined sections can be pulled into their interfitting relationship. A spring clutch allows the coupling nut to be readily rotated when advancing the splined sections together but resists reverse rotation.

BACKGROUND OF THE INVENTION

Field of the invention

This invention relates generally to electrical connectors, and pertains more specifically to a connector having a detachable backshell.

Description of the prior art

Backshells, of course, have been used in the past where a connector is to be utilized in conjunction with electrical or electronic circuitry and such backshells have previously been threadedly attached to the connector. In mating and unmating the connector, however, torque has been applied to the backshell which has produced relative angular motion between the backshell and the connector body. When the backshell is allowed to twist with respect to the connector body, the conductors leading to the pin contacts (or the socket contacts, as the case may be) are apt to be pulled loose or cause deflection and thereby displacement of the contacts from their geometric mateable position. Where the connector is used in critical circuitry, such as in strategic aircraft and space operations, it is imperative that the various conductors leading into the connector through the backshell not be pulled loose and detached from the contact of the connector, or displaced from true position.

SUMMARY OF THE INVENTION

Accordingly, one object of the present invention is to obviate the relative motion between the backshell and the connector body that has resulted in the past, instead transmitting the torque directly from the backshell to the particular end of the connector to which it is attached via interfitting splined sections.

Another object of the invention is to provide a connector and backshell combination utilizing a coupling nut that will not vibrate loose, the rotation in one direction being readily permitted by a spring clutch and the reverse rotation being resisted by said clutch.

A further object is to employ a ball bearing arrangement that not only affords anti-friction rotation of the coupling nor in the direction it is rotated to engage the splined sections but which arrangement is achieved with minimal geometry.

Yet another object of the invention is to provide a connector and backshell that will provide a good electrical path between the backshell and the connector.

Briefly, the invention includes a pair of separable connector units, one of which at least is provided with a splined end section which is received in a complementarily splined end section on the backshell. A coupling nut is rotatably mounted on the backshell by means of a ball bearing arrangement and the threads contained in the coupling nut can be advanced and retracted on threads provided on the particular connector unit that is to have the backshell attached thereto. Once it has been determined at what angle the backshell is to extend from the connector, the backshell can be made up through the agency of the coupling nut so that it assumes the proper angular position, there being virtually no limit to the precise angularity of the backshell with respect to the connector owing to the large number of teeth constituting the splined sections. When properly coupled, the backshell, for all intents and purposes, is rigidly coupled with the connector body or shell encasing the contacts of the particular connector unit to which the backshell is attached. Any chance that there will be undesired relative motion due to the transmission of torque from the backshell to the connector body in this way is obviated.

BRIEF DESCRIPTION OF THE DRAWINGS

FIG. 1 is a side elevational view of a typical connector having a backshell attached thereto in accordance with the present invention, the two gland components constituting the particular backshell being oriented so as to produce a straight-line entry of the cable into the connector;

FIG. 2 is a view corresponding generally to FIG. 1 but with one component of the backshell directed downwardly rather than horizontally as in FIG. 1, the view for the most part being in section and on an enlarged scale so as to show to better advantage the internal construction employed when practicing the invention;

FIG. 3 is a view of the connector and backshell in the form pictured in FIG. 2 but with backshell detached and rotated approximately 45° about a vertical axis so as to expose a segment of its internally splined section;

FIG. 4 is an enlarged fragmentary view corresponding to FIG. 2 but illustrating only the connector unit to which the backshell is attached;

FIG. 5 is a sectional view similar to FIG. 4 but additionally depicting part of the insert in section so as to illustrate the relatively delicate crimping of one conductor, and FIG. 6 is a sectional view taken in the direction of line 6—6 of FIG. 2 for the purpose of illustrating with greater clarity the interfitting splined sections and the ball bearings for the coupling nut.

DESCRIPTION OF THE PREFERRED EMBODIMENT

First and second connector units 10 and 12 are designed to be detachably mated with each other for the purpose of connecting together a number of conductors. The backshell constitutes a unit designated generally by the reference numeral 14. It will hereinafter be explained how the backshell unit 14 is coupled to the first connector unit 10.

The first connector unit 10 includes a coupling ring 16 having a circumferential portion thereof knurled at 18 so that the ring 16 can be rotated sufficiently when connecting the unit 10 to the unit 12. The unit 10 has three helically arranged guide ramps or grooves 20 formed therein. Since the grooves 20 are conventional, there is no need to illustrate them with any degree of particularity, but if further information is desired concerning these grooves, reference may be made to U.S. Pat. No. 3,100,655 granted Aug. 13, 1963 to Ralph O. Work for "Bayonet Type Coupling With Pivoted Segment Release Means." For a purpose explained later, three inspection holes 22 are located at the inner ends of the ramps or grooves 20.

As will be discerned from FIGS. 2 and 4, the other end of the coupling ring 16 has an internal groove 24 formed therein which accommodates a snap or locking ring 25. The purpose of the snap ring 25 is to hold captive a conventional washer 27. The washer 26 bears against a wave or spring washer 28.

Within the coupling ring 16 is a connector shell 30 forming part of the connector body and having any preferred number of keys 32 which assure that the connector shell 30 will be oriented in the proper angular position when the first connector unit 10 is to be coupled with the second connector unit 12. The connector shell 30 is mounted for rotation within the coupling ring 16, and there is a flange or collar 34 extending around its circumference to prevent axial movement of the shell, the collar 34 being longitudinally restrained by the wave washer 28.

Playing an important part in the practicing of the present invention is a relatively large number of angularly spaced, longitudinally directed teeth forming a splined section 36. This splined section 36 is located at the right end of the connector shell 30. Adjacent the splined section 36 is a threaded section 38, the threaded section 38 being slightly larger in cross section than the splined section 36 as presently explained.

The connector shell 30, as can be learned from FIG. 5, has a threaded section 40. A keyway 42 extends longitudinally through the threads of section 40 and this keyway continues to a shoulder 44 in the bore of the connector shell 30. An insert 46 carries a number of pin contacts 48, one of which appears in FIG. 5, which project from a plug body 50 of rigid dielectric material. The body 50 has a radially extending key 52 that slides in the previously mentioned keyway 42 when the insert 46 is advanced within the connector shell 30. For the purpose of emphasizing the delicate construction of each pin contact 48 the contact shown in FIG. 5 is set forth in considerable detail. It will be perceived that the contact 48 includes a collar 54 and divergent ends 56. An element 58 has a pronged end 60 and a socket end 62, the socket end 62 being crimped at **62*a* onto the bared end 64*a* of a conductor 64. It will be discerned that the element 58 extends through a retaining disc 68 and that a sleeve 70 has an inturned flange 72 that is rotatably journaled in a peripheral groove 74 in the disc 68. The internal threads 40 of the shell 30 and coacting threads on the sleeve 70 allow advancement of the insert 46 through the agency of a serrated ring 78 that is pressfitted over the end of the sleeve 70 remote from the flange 72. Within the sleeve 70 is a rubber plug 80 having a passage 82 for each pin contact 48, the passage 82 having a series of constructions which grip the element 58. It should be evident that the bare end 64*a* of the conductor 64 may become detached from the element 58, or the element 58 from the divergent ends 56, should enough pulling force be applied to the conductor 64**. It is a primary aim of the instant invention to prevent this.

Referring now to a general description of the second connector half or unit 12, it will be seen from the drawings that this unit includes a cylindrical receptacle body 84 having an integral mounting flange 86 intermediate its ends, the flange 86 having mounting holes 88 therein so that the entire unit can be fixedly attached to an apertured bulkhead, for instance. Appropriate bayonets 90 project from the outer surface and fit within the helical ramps or grooves 20, all as specifically set forth in the patent hereinbefore identified. When the bayonets 90 are fully advanced to the inner ends of the helical ramps or grooves 20, such engagement can be visually ascertained through the inspection holes 22 that have been previously mentioned.

Of course, there is an insert 92 corresponding to the insert 46 but instead of having pin contacts 48, socket contacts are provided, although these socket contacts are not specifically shown. It will be understood, though, that the interior of the receptacle body 84 is formed with longitudinally extending keyways into which the keys 32 that are integrally located on the connector shell 30 must be introduced in order to have the pin contacts 48 received in the proper socket contacts of the insert 92. It may be helpful to point out at this time that the receptacle body 84 is formed with longitudinally directed teeth at its left end which constitutes a splined section 94 corresponding to the splined section 36 on the connector shell 30. Similarly, a threaded section 96 is provided which corresponds to the threaded section 38 on the connector shell 30. In other words, what will now be described in detail may be attached to the splined section 94 in the same fashion as it can be attached to the splined section 36.

Accordingly, attention is now drawn to a backshell included in the unit 14 which is denoted generally by the reference numeral 100. The backshell 100 may assume a number of specific configurations but it is believed that the specific configurations selected for illustration will adequately apprise the reader of the versatility of the present invention. The backshell 100 includes a pair of gland components 102, 104, each formed with an inclined surface at 105, more specifically a surface having a 45° inclination with respect to the longitudinal axis of the individual components 102, 104. Through the agency of a pair of screws 106, the backshell 100 can have the gland components 102, 104 connected in the straight line relationship depicted in FIG. 1, or the J-shaped relationship pictured in FIG. 2.

Considering now in detail the construction of the gland component 102, it will be perceived from FIGS. 2 and 4 that the gland component 102 has an integral sleeve 110. As can be learned from FIGS. 2 and 4, the bore of the sleeve 110 is formed with an internal shoulder at 112 which has a groove 114 immediately adjacent thereto. The purpose of the groove 114 will be explained hereinafter. At this time, attention is directed to a number of longitudinally directed, angularly spaced teeth that collectively constitute an internally splined section 116, this section 116 being adjacent the free end of the sleeve 110.

Extending around the outer surface of the sleeve 110 is an annular groove 118. A number of ball bearings 120 are rollably received in this groove 118 and extend into a groove 122 formed in the interior of a coupling nut 124, a retaining ring 125 keeping the ball bearings 120 captive. Stated somewhat differently, the sleeve 110 constitutes an inner race and the coupling nut 124 an outer race for the resulting ball bearing assembly. The nut 124 can be rotated by virtue of its hexagonal flats 126 or by virtue of the knurled sections 128 therebetween.

The coupling nut 124 has an integral tubular end 130 that contains an internally threaded section 132 designed to engage the previously mentioned threaded section 38 on the connector shell 30. In this way, when the coupling nut 124 is rotated in one direction, the two threaded sections 38, 132 cooperate to advance the entire backshell 100 in the direction of the first connector unit 10. A seal in the form of an O-ring 134 is contained in the groove 114 of the sleeve 110 so that as the advancement progresses, the seal 134 is compressed somewhat and thus presents an effective barrier against moisture.

A friction clutch in the form of a coil spring 136 is provided, the sleeve 110 having an end portion 138 of reduced 25 diameter about which the spring is circumscribed. From FIGS. 2 and 4, it will be perceived that the spring has three full turns or convolutions. The right end 140 of this spring frictionally grips the end portion 138, whereas the other end 142 is bent so as to be received in a hole 144 drilled in the coupling nut 124. The pitch or direction in which the spring 136 is wound or progresses is such that when the coupling nut 124 is rotated in a clockwise direction as viewed from the right in FIG. 4, the spring 136 is expanded and allows the nut 124 to rotate freely to effect the meshing or interfitting of the splined section 116 with the splined section 36. Yet when the nut 124 is rotated in an opposite direction, the spring 136 contracts against the end portion 138 and resistance is automatically developed. By virtue of the resistance, the nut 124 cannot inadvertently vibrate loose which would result in the unwanted separation of the splined sections 36 and 116.

The cable to be connected is indicated generally by the reference numeral 141, having outer insulation 143, metallic braid 145 and the individual conductors 64 that lead into the connector unit 10, more specifically its insert 46. From FIG. 2, it will be perceived that a tapered collet 146 having a frusto-conical end 148 is intended to have the braid 145 reversely bent at 150 thereabout. The tapered collet 146 has an outer threaded section 152, an intermediate flange or collar 154, and an inner threaded section 156. A braid clamp 158 has a tapered bore 160 such as to press against the reversely turned braid 150 and by means of internal threads 162, the clamp 158 can be rotated and advanced so that a pressural action is applied to the braid 150 contained between the end 148 of the collet 146 and the tapered bore 160. Since the cable 141 may vary somewhat in size, a resilient gland seal 164 accommodates the maximum variation that can be expected. Also, a rear gland seal 166 is located in a groove 168 internally formed in the gland component 104. A backup or nut 170 is threadedly engaged in the threaded section 156 of the collet 146, the nut 170 having a surface which bears against a washer 172 when the nut 170 is tightened so as to force the washer 172 against the end of the gland component 104.

Although the benefits to be gained from a practicing of our invention should be manifest from the foregoing description, it perhaps will be well to present a brief description of how the backshell 100 will normally be attached to the first connector unit 10. Assuming, however, that the various conductors 64 have been electrically attached to the pin contacts 48 by crimping at **62*a* the socket end 62 of the elements 58 to the bared ends 64*a* of the conductors 64 as illustrated in FIG. 5, and that the connector shell 30 has been positioned within the coupling ring 16, the insert 46 is then angularly oriented within the connector shell 30 as assured by the keyway 42, the insert 46 having the key 52 thereon which must be received in this keyway. By angularly positioning the insert 46 within the connector shell 30, it will be recognized that the keys 32 are then in the proper angular relationship so that the pin contacts 48 will enter the socket contacts (not shown) of the insert 92 contained in the receptacle body 84 of the second connector unit 12**.

Since the direction of the cable 141 will generally be governed by certain installation conditions, such as the location of the connector unit 12 with respect to the equipment to which the cable 141 leads, this poses no problem whatsoever with the present invention. Initially, the first and second connector units 10 and 12 can be mated together in conventional fashion. This is accomplished merely by orienting the helical ramps or slots 20 so that they can be advanced with respect to the bayonets 90. In this particular situation, the mounting flange 86 retains the receptacle body 84 in a fixed relationship with, for instance, a bulkhead or other mounting plate. Hence, it is necessary to twist the coupling ring 16 so as to effect the engagement of the two units 10 and 12. The keys 32 on the connector shell 30 must be angularly oriented at this time so that they can fit into the associated keyways within the receptacle body 84.

When the two units 10, 12 have been engaged, then the gland component 102 can be moved toward the connector unit 10 and angularly positioned in the best relationship for the direction in which the cable 141 extends. If the cable 141 is to extend horizontally as shown in FIG. 1, the angular orientation becomes unimportant. On the other hand, if the cable 141 is to extend downwardly as indicated in FIG. 2, then the gland component 102 must be advanced so that its edge or surface 105 is in the direction depicted in FIG. 2. On the other hand, if the cable 141 is to extend upwardly, the gland component 102 will be rotated through 180° from that shown in FIG. 2. The technician has other choices available, such as utilizing a modified gland component 104 that will provide a 45° relationship with the component 102 when the two are attached.

At any rate, once the angular orientation of the gland component 102 has been determined, all that is necessary is that the coupling nut 124 be advanced so that its threaded section 132 engages with the threaded section 38 of the connector shell 30. The splined section 116 is thus pulled longitudinally into meshing or interfitting engagement with the splined section 36, the individual teeth of these two splined sections 36 and 116 preventing the gland component 102 from rotating even the slightest amount with respect to the connector shell 30. In this way, the backshell component 102 is locked to the shell 30. When the coupling nut 124 has been fully tightened, then there will be the requisite amount of compression of the seal 134.

The coil spring 136, being wound in a direction such that it is caused to expand away from the end portion 138 of the sleeve 110 when the coupling nut 124 is tightened as described above. It will be remembered that the left end 142 of the spring 136 is anchored with respect to the coupling nut 124, more specifically, its tubular end 130. The right end 140 of the coil spring 136 is only frictionally engaged with the sleeve 110 so that virtually no resistance to rotation is introduced. On the other hand, if an attempt is made to reverse the rotation of the coupling nut 124, such as when it is being backed off to disengage the interfitting splined sections 36, 116, then the coil spring 136 is caused to constrict and tighten about the sleeve 110, more specifically about its end portion 138. Thus, in this way any tendency for the coupling nut 124 to work itself loose, such as by vibration, is virtually eliminated. Yet, when the backshell 100 is intended to be detached or reoriented with respect to the connector unit 12, it can be easily accomplished because the resistance can be manually overcome.

Consequently, our present invention allows the technician to mate and unmate the connector units 10 and 12 without pulling the crimped ends of the conductors 64 loose, as explained when describing FIG. 5. The difficulty previously encountered with prior art backshell arrangements due to the application of torque produced during the mating and unmating procedure is avoided. This is because the backshell 106 is literally made rigid with the connector shell 30 of the connector unit 10.

We claim:

1. A first electrical connector unit engageable at one end with a second connector unit so as to establish electrical connection therebetween, said first unit comprising a shell member having a series of teeth at the end thereof remote from said one end of the unit collectively forming a first splined section and having a threaded section adjacent thereto, a backshell including a sleeve having a series of teeth at one end collectively forming a second splined section of a size so as to be axially engageable with said first splined section, a coupling nut rotatably mounted on said sleeve having an internally threaded section projecting forwardly from said second splined section and adapted to engage the threaded section on said shell so as to axially advance and retract said backshell relative to the shell of said first connector unit and clutch means allowing said coupling nut to move freely in a rotative direction to advance said backshell sleeve and to impose a frictional resistance to the rotation of said nut in a reverse direction, which reverse direction retracts said backshell.

2. The combination set forth in claim 1 in which the teeth on said shell member forming said first splined section are externally located and the teeth on said sleeve forming said second splined section are internally located.

3. The combination set forth in claim 1 in which said clutch means includes a coil spring between said coupling nut and said backshell sleeve which contracts against said backshell sleeve when said coupling nut is rotated in said reverse direction, said coil spring having one end movable with said coupling nut and the other end frictionally engaging said backshell sleeve.

4. A backshell for an electrical connector comprising a sleeve having at one end a series of angularly spaced teeth forming a splined section, a coupling nut rotatably mounted on said sleeve for attaching said backshell to the electrical connector, a coil spring disposed between said sleeve and said coupling nut having one end anchored to said nut so as to be rotated therewith and its opposite end in frictional engagement with said sleeve, said spring being wound in a direction to cause contraction thereof and thereby impose a frictional drag upon said coupling nut when said nut is rotated in a direction to disengage the backshell from the connector, said spring expanding and thereby allowing said coupling nut to be rotated freely in a direction to effect engagement of said backshell with the connector.

5. The backshell set forth in claim 4 including a plurality of ball bearings confined between said sleeve and said coupling nut.

References Cited

UNITED STATES PATENTS

| | | | |
|---|---|---|---|
| 1,681,444 | 8/1928 | Stevens | 285—81 |
| 2,422,982 | 6/1947 | Quackenbush | 174—87 |
| 2,735,990 | 2/1956 | Gehlsen | 339—86 |
| 3,201,149 | 8/1965 | Bragg | 285—39 |
| 3,207,535 | 9/1965 | Wilson | 285—86 |
| 3,343,852 | 9/1967 | Blight et al. | 285—82 |
| 3,351,886 | 11/1967 | Zimmerman | 339—90 |

FOREIGN PATENTS

| | | | |
|---|---|---|---|
| 616,335 | 1/1949 | Great Britain | 339—91 |

MARVIN A. CHAMPION, Primary Examiner

J. McGLYNN, Assistant Examiner

U.S. Cl. X.R.

339—91

UN... STATES PATENT OFFICE

CERTIFICATE OF CORRECTION

Patent No. 3,546,658 Dated December 8, 1970

Inventor(s) Arden D. Van Horssen et al

It is certified that error appears in the above-identified patent and that said Letters Patent are hereby corrected as shown below:

Column 1, line 65, "nor" should be --nut--. Column 4, line delete "25".

SIGNED AND SEALED MAR 9 1971

(SEAL)
Attest:

Edward M. Fletcher, Jr.
Attesting Officer

WILLIAM E. SCHUYLER,
Commissioner of Paten